United States Patent Office 3,505,205
Patented Apr. 7, 1970

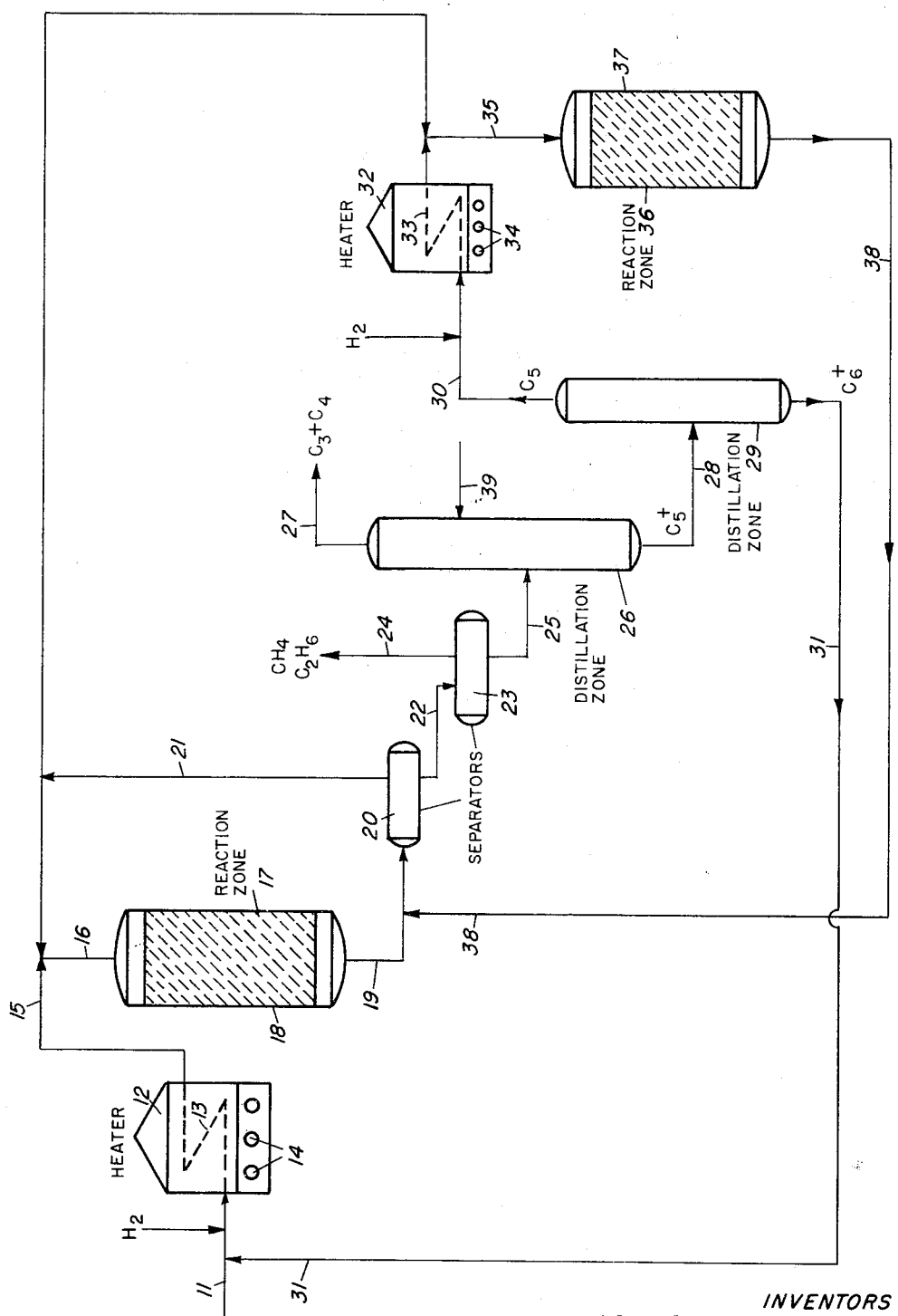
INVENTORS
JOSEPH P. GIANNETTI
HOWARD G. McILVRIED
RAYNOR T. SEBULSKY

3,505,205
PRODUCTION OF LPG BY LOW TEMPERATURE HYDROCRACKING
Joseph P. Giannetti, Allison Park, Howard G. McIlvried, Pittsburgh, and Raynor T. Sebulsky, Verona, Pa., assignors to Gulf Research & Development Company, Pittsburgh, Pa., a corporation of Delaware
Filed Apr. 23, 1968, Ser. No. 723,445
Int. Cl. C10g 13/00
U.S. Cl. 208—59                              21 Claims

ABSTRACT OF THE DISCLOSURE

Hydrocarbons are hydrocracked under unusually mild conditions employing a catalyst which comprises a major proportion of alumina and a minor portion of metalliferous material having hydrogenating activity, that has been activated with a sulfur chloride, a mixture of sulfur dioxide and chlorine, boron trichloride, a phosphorous chloride or a carbon chloride following a hydrogen chloride pretreatment of the catalyst. The bromine analogs of the chlorine activating agents can also be employed.

---

This invention relates to a process for the production of LPG (liquefied petroleum gas). More particularly, this invention relates to a hydrocracking process wherein high yields of LPG are produced under exceptionally mild conditions.

LPG or liquefied petroleum gas is a high heating value gas which consists essentially of propane and butane. It finds wide use as a "bottled gas" for domestic gas and heating, as an additive for town gas and as a direct motor fuel in farm and commercial vehicles. Additionally, LPG is being used in increasing amounts in the manufacture of petrochemicals, since propane and butane may serve as starting materials in alkylation, isomerization and polymerization processes, as well as many other processes.

Catalytic hydrocracking has been utilized for the production of low boiling hydrocarbons including propane and butane, from liquid hydrocarbon charge stocks with the recycle of the undesired products. However, at the temperatures required for maximum conversion to low boiling products of the recycled material, the catalyst soon becomes deactivated, necessitating costly regeneration and/or replacement.

A two-stage hydrocracking process has been proposed in an attempt to maximize the conversion to low boiling hydrocracked products. According to this process, a naphtha feedstock is catalytically hydrocracked under relatively mild hydrocracking conditions in a first stage. The LPG product fraction of this first stage is recovered and a relatively high boiling fraction is recycled to the first stage for further conversion. Meanwhile, an intermediate product fraction from the first stage is passed to a second hydrocracking stage for conversion at relatively severe hydrocracking conditions for production of additional LPG.

The two-stage arrangement permits the employment of optimum hydrocracking conditions in each hydrocracking stage so as to maximize the production of LPG. By employing relatively mild conditions in the first stage, the heavier hydrocarbons are optimumly converted to LPG with relatively little catalytic deactivation, while the employment of relatively severe conditions in the second stage permits high conversion of the more difficult-to-hydrocrack medium boiling range materials that are initially present in the naphtha or that are produced in the first stage, such as pentanes and/or hexanes.

The foregoing two-stage process is highly suitable for maximizing yields of LPG from hydrocarbon feedstocks. However, undesirably high temperatures are required in the second hydrocracking stage in order to obtain commercially feasible quantities of LPG. The hydrocracking catalysts heretofore employed are not sufficiently active so as to permit sufficient conversion of the difficultly hydrocracked materials under the more economically desirably mild conditions.

It has now been found that hydrocarbons boiling in the range below 500° F., and particularly the difficultly hydrocracked hydrocarbons, such as pentane, may be hydrocracked to produce high yields of LPG under unusually mild hydrocracking conditions. Surprisingly, it has been discovered that high yields of LPG may be produced under mild temperature conditions according to the process of the present invention, which comprises contacting a hydrocarbon charge stock that boils in the range below 500° F. and hydrogen under hydrocracking conditions with an activated composite catalyst comprising alumina and a metalliferous hydrogenating component having hydrogenating activity wherein the composite material has been activated by treatment with a chlorine-containing activating agent selected from the group consisting of:

(A) A sulfur chloride having the generic formula $$S_dO_aCl_bZ_c$$

wherein Z is a halogen other than chlorine, $d$ is 1 or 2, $a$ is 0, 1, 2, 3 or 5, $b$ is 2, 4 or 7, $c$ is 0 or 1 and the sum of $b$ and $c$ is 2 to 8;

(B) A mixture comprising sulfur dioxide and chlorine;
(C) A phosphorous chloride such as phosphorous oxychloride (POCl$_3$), a phosphorous trichloride, phosphorous pentachloride, etc.;
(D) Boron trichloride;
(E) A monocarbon chloride having the formula

wherein X and Y may be the same or different groups and when taken individually are hydrogen, halogen or SCl, and when taken together are oxygen or sulfur;
(F) A poly-carbon polychloride preferably having at least two chlorine atoms on one carbon atom such as 1,1-dichloroethane (CH$_3$CHCl$_2$), 1,1,1-trichloroethane (CH$_3$CCl$_3$), 1,1,2-trichloroethane (CHCl$_2$CH$_2$Cl), 1,1-dichloroethylene (CH$_2$=CCl$_2$), hexachloroethane, 1,1,1,2-tetrachloropropane (CH$_3$CHClCCl$_3$), etc.;
(G) An acetyl chloride such as trichloroacetyl chloride (CCl$_3$COCl), etc., and
(H) A mixture of two or more of the activating agents specified in (A) through (G). The activation of the composite is conducted under non-reducing conditions at a temperature effective to promote a substantial increase in the chlorine content of the catalyst, with the proviso that when the activating agent employed is a carbon chloride, the composite catalyst is subjected to a pretreatment with hydrogen chloride.

In addition, the bromine analogs of the above-specified chlorine compounds can be employed; however, the chlorine-containing activating agents are preferred. Examples of the bromine-containing activating agents include sulfur monobromide, thionyl bromide, phosphorous tribromide, boron tribromide, carbon tetrabromide, bromoform, carbonyl dibromide, dibromothione, 1,1-dibromoethane, 1,1,1-tribromoethane, 1,1-dichloro - 2,2 - dibromoethane, hexabromoethane, acetyl bromide, etc. In the following disclosure specific reference to the bromine activating agents and reference to catalysts activated with the bromine activating agents is omitted to simplify the disclosure, nevertheless, it is to be understood that the disclosure applies to the bromine activating agents and the bromine activated catalysts obtained therefrom corresponding to the chlorine activating agents and the chlorine activated catalysts obtained therefrom as specified or described herein.

Utilization of the aforesaid activating agents produces a highly active catalyst and thus permits the employment of unusually mild hydrocracking conditions. In fact, the yields of LPG that can be obtained with the activated catalysts of the present invention, can be obtained with previous hydrocracking catalysts, if at all, only under much more severe conditions.

According to one aspect of the present invention, a naphtha fraction boiling in the range below 500° F. is hydrocracked under mild hydrocracking conditions to produce high yields of LPG.

According to another aspect of the present invention difficultly hydrocracked hydrocarbons, such as pentane, are hydrocracked under conditions heretofore suitably employed only for the more easily convertible hydrocarbons.

In still another aspect of the present invention, hydrogen and a hydrocarbon fraction boiling in the range below 500° F. are introduced into a first hydrocracking zone under reaction conditions conducive to hydrocracking the feed stocks so as to form about 40 to 90 percent by volume of the charge of materials boiling below the charge and comprising predominately $C_3$ and $C_4$ hydrocarbons. Either a conventional hydrocracking catalyst or an activated composite catalyst of the present invention can be employed in this first zone, each utilized at the conditions appropriate therefor. The resulting product contains a plurality of fractions which are separated into a light fraction, comprising methane and ethane, a predominate fraction comprising the LPG, i.e. propane and butane, a $C_5$ fraction comprising pentane, and a heavy fraction comprising those hydrocarbons boiling above the pentane fraction, i.e. a $C_6+$ fraction. The propane-butane fraction is, of course, recovered as the desired LPG product. The heavy $C_6+$ fraction is preferably recycled to the hydrocracking zone to extinction for further conversion to LPG. The pentane or $C_5$ fraction is passed as charge stock to a second hydrocracking zone for conversion to additional LPG.

The second hydrocracking zone is provided with the activated composite catalyst of the present invention. The $C_5$ fraction is thereby hydrocracked under desirably mild conditions to form high yields of LPG. The pentane or $C_5$ fraction cannot be effectively recycled to the first hydrocracking zone for further conversion as in the case of the $C_6+$ fraction. Whereas a high conversion of the $C_6+$ fraction to propane and butane is realized when this fraction is recycled to the hydrocracking zone, little or no conversion of the $C_5$ fraction to propane or butane is obtained at the hydrocracking conditions most desirably suitable for hydrocracking the hydrocarbon charge stock to the first hydrocracking zone. Furthermore, if the temperature in the first hydrocracking zone is raised sufficiently for the conversion of the $C_5$ fraction, the catalyst is rapidly deactivated as previously mentioned. In addition, selectivity to LPG is significantly reduced. These problems are avoided and effective conversion of the $C_5$ fraction to LPG is effected by passing this fraction to a second hydrocracking zone that contains the catalyst of the present invention as previously described.

In the following description and examples, several preferred embodiments of this invention have been set forth, but it is to be understood that they are given by way of illustration only and not in limitation thereof.

The charge stock to be converted in the process of the present invention may be any hydrocarbon fraction boiling in the range below 500° F. Suitably, the hydrocarbon charge stocks are normally liquid hydrocarbons and may include light gasoline, naphtha, heavy gasoline, kerosene, natural gas condensate, components thereof, and mixtures of components of these several fractions. Both straight-run and cracked fractions are suitable charge stocks, e.g. straight run and cracked naphthas. A preferred charge stock for the present process comprises the pentanes and/or hexanes.

The highly active hydrocracking catalyst of the present invention is a composite catalytic material comprising a major proportion of alumina and containing a minor proportion of a metalliferous material having hydrogenating activity, such as platinum metal, which composite catalyst has been activated by contact with a chlorine-containing activating agent under non-reducing conditions at an elevated temperature effective to promote a substantial increase in the chlorine content of the composite catalyst. The use of non-reducing conditions is important as reducing conditions may lead to formation of hydrogen chloride, which in turn will reduce the effective amount of chlorine available to combine with the catalyst base. The non-reducing conditions can be achieved merely by exclusion from the reaction zone of materials other than the catalyst base and the chlorine-containing activating agent. Alternatively, the activating agent, e.g. sulfur monochloride, can be contacted with the catalyst base, together with an inner carrier gas such as nitrogen, or with an oxidizing gas such as air or oxygen. Likewise, the catalyst may be contacted with an inert carrier gas subsequent to the activation treatment.

By "non-reducing conditions" is meant merely essentially non-reducing conditions. Accordingly, conditions under which a small proportion of a reducing component such as hydrogen is present are not intended to be excluded. The catalyst base may be contacted with the activating agent in any proportions and under any conditions sufficient to significantly increase the chlorine content of the catalyst base. Proportions sufficient to increase the chlorine content of the catalyst base by about one percent under the reaction conditions employed will produce an appreciable improvement in the activity of the catalyst, but it is preferred to utilize larger proportions sufficient to increase the chlorine content of the catalyst by at least about three and preferably up to about 20 percent by weight. However, still larger proportions can be used: for example, there can be used amounts sufficient to yield up to 30 percent chlorine in the catalyst base without undue difficulties. Within the limits indicated, the use of the activating agent in weight ratios of from about 0.02 to about 20.0, and preferably from about 0.05 to about 3 with respect to the catalyst base, are effective at the conditions disclosed herein to achieve the desired results. By way of illustration, examples of weight ratios of sulfur monochloride to catalyst that may be suitably employed include 0.66:1, 0.33:1, 0.17:1 and 0.1:1.

The activating agent interacts with the catalyst base most readily at elevated temperatures. Very active catalysts are obtained when using treating temperatures in the range of between about 325° and about 1050° F., but higher or lower temperatures can be used. For example, temperatures as low as about 200° F. are effective to promote the desired interaction. The treating temperature should not exceed about 1000° F. to avoid unnecessarily reducing the amount of chlorine combined with the catalyst base. Within the temperature ranges disclosed, contact times of from about five minutes to about five hours, preferably from about 0.5 to about three hours, are effective to increase the chlorine content of the catalyst base to a satisfactory level for purposes of this invention.

It is presumed that the chlorine portion of the present chlorine-containing activating agents interacts chemically in some not fully understood way with the catalyst base. Available evidence indicates that the nature of the reaction is unique, as catalysts prepared in the manner disclosed herein are markedly superior to comparable catalysts in which the chlorine content of the catalyst is increased, for example, by treatment with vaporous aluminum chloride.

Composite catalytic materials that have been activated in the manner indicated above are highly effective as low temperature hydrocracking catalysts. Furthermore, especially advantageous results are obtained when the activating treatment is preceded and/or followed by a further activating treatment with hydrogen chloride as will be hereinafter discussed.

As previously mentioned, the chlorine-containing activating agent can be a sulfur chloride $S_dO_aCl_bZ_c$ as defined above. Exemplary of the sulfur chlorides contemplated are, for example, the sulfur oxychlorides such as thionyl chloride, sulfuryl chloride, sulfur trioxytetrachloride, sulfur pentaoxychloride, sulfur monooxytetrachloride, as well as the non-oxygen containing sulfur chlorides, such as sulfur monochloride, sulfur dichloride and sulfur tetrachloride.

The composite catalytic materials that have been activated by the sulfur chloride activating agents described above are highly effective as low temperature hydrocracking catalysts. However, especially advantageous results may be obtained when the sulfur chloride activating treatment is preceded and/or followed by a further activating treatment with hydrogen chloride.

The hydrogen chloride pretreatment of the composite catalytic material may be carried out under any conditions which are effective to remove at least a portion of the water not previously removed during calcining and drying of the composite catalytic material and that will not adversely affect the catalytic activity of the catalyst by sintering. Temperatures in the range of from about 950° to 1250° F., preferably from about 1000° to about 1100° F., are normally effective for this purpose. Temperatures significantly less than about 950° F. should not be used for purposes of the present invention, since such lower temperatures are relatively less effective to enhance the susceptibility of the catalyst base to activation with the sulfur chloride. The water which is removed during the pretreatment can be physically adsorbed water, chemically or pseudochemically bound water, such as water of hydration or water formed by the reaction of hydroxyl groups present on the surface of the alumina.

The hydrogen chloride employed in the pretreating step may be used in any proportion with respect to the composite catalytic material that is effective to increase its chlorine content and effectively increase the hydrocracking catalytic activity obtainable by the subsequent treatment with the sulfur chloride.

It is preferred to employ hydrogen chloride in substantial excess of the amount that is capable of combining with the composite catalytic material at the reaction conditions employed. Excellent results are obtainable by the use of hydrogen chloride in proportions of from about 0.1 to about 1:1 by weight with respect to the catalyst; but larger or smaller proportions can also be used with good results. The action of the hydrogen chloride upon the composite catalytic material takes place easily at atmospheric pressures, and elevated pressures are not necessary, although such pressures may be used if desired.

The hydrogen chloride pretreatment described above, can be carried out for as little as a few minutes, since some hydrogen chloride can combine with the catalyst even when only a small amount of water is removed from the composite catalytic material, but it is preferred to continue the hydrogen chloride treatment until no further evolution of water can be observed and until no further combination of hydrogen chloride with the catalyst is obtained at the reaction conditions selected. Normally this point will have been reached before about three hours at the temperatures indicated, and no further advantage is obtained by longer periods of the hydrogen chloride treatment, although the pretreatment has been successfully carried out for as long as six hours.

The hydrogen chloride utilized in the pretreating operation need not be pure and may contain other materials that do not adversely affect the hydrocracking activity of the finished catalyst. In fact, it is preferred to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but may be introduced in the form of a hydrogen chloride precursor, such as propyl chloride, t-butyl chloride or other chlorine-substituted aliphatic hydocarbon, when hydrogen is used as the diluent gas.

A hydrogen chloride aftertreatment may be carried out at any conditions that will not significantly reduce the chlorine content of the sulfur chloride activated catalyst. Temperatures in the range of from about 60° to about 900° F., can be used. While some effect of the hydrogen chloride aftertreatment may be noted at temperatures below about 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts can be used. By way of illustration, excellent results are obtainable by the use of hydrogen chloride in proportions of about 0.1 to 1:1 by weight with respect to the activated catalyst.

Similarly, as in the case of the hydrogen chloride pretreatment, the hydrogen chloride aftertreatment can be carried out at ambient atmospheric pressures, and elevated pressures are not necessary, although such pressures can be used. Also as in the case of the hydrogen chloride pretreatment, the contact with hydrogen chloride can be effected over a period of a few minutes to several hours with good results. If desired, the hydrogen chloride aftertreatment can be carried out before or during contact of the catalyst with a hydrocarbon feed to be hydrocracked. No significant additional advantages are observed from carrying out the hydrogen chloride aftertreatment beyond three hours, although longer treating periods can be used successfully.

Further, as in the case of the hydrogen chloride pretreatment, the hydrogen chloride need not be pure and may contain as a diluent in any proportion hydrogen gas or inert diluent gases such as nitrogen and the like. By way of illustration, good results are obtainable when hydrogen is employed in proportions of from about 1:1 to about 10:1 by volume with respect to the hydrogen chloride.

Other highly suitable chlorine-containing activating agents that can be employed in order to produce a highly active composite catalyst for use in the hydrocracking process of the present invention comprise boron trichloride, chlorine-containing phosphorous compounds such as phosphorous oxychloride and phosphorous trichloride, or a mixture of sulfur dioxide and chlorine. As in the case of the sulfur chloride activating agent, the activity of composite catalysts that are activated with these activating agents may be further enhanced by a hydrogen chloride pretreatment and/or a hydrogen chloride post-treatment. These hydrogen chloride treatments of the activated composite catalyst are conducted in the manner and under the conditions previously described.

A still further suitable chlorine-containing activating agent for the production of the highly active hydrocracking catalyst of the present invention is a carbon chloride activating agent having the formula

wherein X and Y represent the groups previously defined.

Suitable carbon chloride activation compounds include chloroform ($CHCl_3$), methylene chloride ($CH_2Cl_2$), dichlorodifluoromethane ($CCl_2F_2$), trichlorobromomethane ($CCl_3Br$), thiocarbonyltetrachloride ($CCl_3Sl$), trichlorofluoromethane ($CCl_3F$), dichlorodibromomethane ($CCl_2Br$), and dichlorobromofluoromethane ($CCl_2BrF$). However, any compound having the general formula $CCl_2XY$ where X or Y may be a monovalent radical of either hydrogen, halogen or SCl, or where X and Y taken together may be oxygen or sulfur, may be employed for the activation of the present composite catalysts. Other chlorides containing two or more carbon atoms per molecule are also suitable activating agents. Especially suitable are those compounds in which two or more chlorine atoms are attached to a single carbon atom such as 1,1,1-trichloroethane ($CH_3CCl_3$), hexachloroethane, 1,1,2-trichloroethane ($CHCl_2CH_2Cl$), 1,1-dichloroethylene ($CH_2=CCl_2$), trichloroacetyl chloride ($CCl_3COCl$), etc.

In contradistinction to the composite catalysts that have been activated with either a sulfur chloride, boron trichloride, phosphorous chloride, or a mixture of sulfur dioxide and chlorine as described above wherein it is preferred to enhance the activation of such catalysts with a hydrogen chloride post and/or pretreatment, it is vital to the successful employment of the carbon chloride-activated composite catalyst that it be subjected to a pretreatment with hydrogen chloride. Such a hydrogen chloride pretreatment is necessary for the production of a highly active composite hydrocracking catalyst which may be successfully employed under mild temperature conditions. However, as in the case of the sulfur chloride, boron trichloride, the phosphorous chloride, and the sulfur dioxide-chlorine activating agents, the activity of the hydrogen chloride-pretreated carbon chloride activated catalyst may be further enhanced by a further treatment with hydrogen chloride. The conditions employed for the hydrogen chloride pretreatment and aftertreatment may be suitably those previously described.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina monohydrate such as boehmite and diaspore, or various combinations of any of these can be used. Also there can be used the aluminas described in U.S. Patents Nos. 3,151,939, 3,151,940 and 3,188,174, in the names of William L. Kehl and Meredith M. Stewart, which aluminas are prepared by calcining an alumina hydrate containing 1.2 to 2.6 mols of water of hydration.

The alumina bases useful in the present invention can be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to 500 $m.^2/g.$ or even more.

Especially advantageous results are obtainable when using aluminas having a surface area above about 250 $m.^2/g.$ and more particularly, about 300 $m.^2/g.$, although aluminas of lower surface area can be used. Presumably, the amount of chlorine that can be taken up during the activation treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from Group 6b or from Group 8 of the Periodic Table of the Elements as shown in page B-3 of the 48th edition of the Handbook of Chemistry and Physics published by the Chemical Rubber Publishing Company. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or one percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the alumina hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with the chlorine-containing activating agent, so as to minimize loss of the hydrogenating component by formation of volatile complexes during the activation treatment. In the case of base metals such as nickel and tungsten, the hydrogenating component can remain in the form of a sulfide or oxide prior to the hydrogen chloride pretreatment and the sulfur chloride, sulfur dioxide-chlorine or carbon chloride activation treatment.

It is also important that the hydrogenating component be composited with the alumina base before the hydrogen chloride pretreatment and the activation treatment, as deposition thereafter normally will result in a reduction of the chlorine content of the chlorine activating agent-treated base. This is undesirable, as the activity of the herein-disclosed catalyst appears to be generally related to the increase in chlorine content attributable to the activation treatment.

The catalyst base may contain halogen other than that incorporated by the activation treatment. For example, some halogen content may result from the use of an aluminum halide as a starting material to form to alumina base and/or some halogen may remain in the catalyst owing to the use of a halogen-noble metal acid. However, the halogen content from such sources as these does not appear to be equivalent, for purposes of this invention, to the halogen content resulting from the activation treatment.

The invention will be further illustrated by reference to the accompanying drawing.

Referring to the drawing, a hydrocarbon charge stock, such as a naphtha or a pentane fraction thereof, is passed along with make-up hydrogen through a line 11 to a heater or furnace 12 provided with a heating coil 13, and the burners 14. The heated hydrocarbon-hydrogen mixture is then passed by way of a line 15, into a line 16 where it mixes with recycle hydrogen. The heated mixture is then passed into a hydrocracking reactor 17, which contains an activated hydrocracking catalyst 18 of the present invention, that has been prepared as described above.

The conditions in the reactor 17 are relatively mild, but result in high yields of $C_3$ and $C_4$ hydrocarbons (LPG). Suitable temperatures which may be employed include those in the range of between about 350° and about 700° F., preferably between about 400° and about 525° F., and a specially preferred range between about 460° and about 520° F. Suitable pressures which may be employed in zone 17 include those between about 500 and about 3000 p.s.i.g., preferably between about 750 and about 1500 p.s.i.g. A liquid hourly spaced velocity (LHSV) of between about 0.1 and about 5, preferably between about 0.5 and about 2 may be employed.

Hydrogen is admixed with the hydrocarbon charge stock at the rate of between about 2000 and about 20,000, preferably between about 5000 and about 10,000 standard cubic feet per barrel (s.c.f./bbl.). A hydrogen to hydrocarbon molar ratio in the range of between about 2:1 and about 20:1, preferably between about 3:1 and about 9:1 is suitably employed.

The LPG-containing product stream is discharged from the reactor 17 by means of a line 19, and is passed to the separator 20, where unconsumed hydrogen is removed and recycled by way of lines 21 and 16 to the reactor 17. The liquid product is passed by way of a line 22 to the separator 23, where methane and ethane are removed as by-products by means of the line 24.

The make-up hydrogen gas stream, as well as the hydrogen stream recycled to the hydrocracking zone, need not be completely free from impurities and may contain between about 40 and about 100 percent hydrogen and preferably between about 60 and about 100 percent hydrogen by volume, the remainder being predominantly methane.

The bottoms from the separator 23, are removed via a line 25, and are introduced into the distillation zone 26, where the conditions are adjusted for the removal of an overhead propane and butane product fraction via the line 27, and a $C_5+$ bottoms fraction is recovered by means of the line 28.

As previously mentioned, a further aspect of the present invention involves a two-stage hydrocracking process. According to this embodiment of the present invention, the charge stock to the resistor 17 is a fraction boiling below 500° F. such as a raw naphtha feed. According to this embodiment, the hydrogen and light by-product materials are recovered from the product stream from reactor 17 as previously described. The $C_5+$ fraction is withdrawn from the distillation zone 26 and is passed by means of the line 28 to a second distillation zone 29, where conditions are adjusted to remove a $C_5$ fraction overhead by means of a line 30, and a $C_6+$ bottoms fraction by the line 31. The $C_6+$ bottoms fraction is recycled to the line 11 where it is mixed with additional fresh charge stock for hydrocracking.

The $C_5$ fraction is passed by means of the line 30, along with make-up hydrogen, to the heater 32, that is provided with a heating coil 33 and the burners 34. The heated $C_5$ hydrogen mixture is passed by means of the line 35 to a second hydrocracking zone 36. The hydrocracking reaction zone 36 is provided with an activated hydrocracking catalyst 37 of the present invention that has been prepared as described above. As previously discussed, the highly-active catalysts of the present invention permit the hydrocracking of the difficultly hydrocracked $C_5$ or pentane fraction under unusually mild hydrocracking conditions.

The second hydrocracking zone catalyst 37 may be the same as or different from the catalyst 18 which is utilized in the first hydrocracking zone 17. Thus, a sulfur chloride-activated composite catalyst may be employed in zone 17, while a sulfur dioxide-chlorine activated composite catalyst may be employed in reactor 36 in the two-stage aspect of the present invention.

Suitable temperature which may be employed in the reactor 36 include those in the range of between about 350° and about 700° F., preferably between about 400° and about 525° F., and a most preferred range between about 460° and about 525° F. Pressures in the range of between about 500 and about 3000 p.s.i.g., preferably between about 750 and about 1500 p.s.i.g. may be employed. Hydrogen at the rate of between about 2000 and about 20,000, preferably between about 5000 and about 10,000, standard cubic feet per barrel of hydrocarbon feed is introduced into the reaction zone 36, while a hydrogen-hydrocarbon mol ratio of between about 2:1 and about 20:1, preferably between about 3:1 and about 9:1, may be suitably employed.

In the event that the feedstock which is introduced into the first stage of the two-stage hydrocracking process contains various impurities such as sulfur and water, which are catalyst poisons, the feedstock should be purified prior to its introduction into the first stage.

According to still another embodiment of the present invention, a conventional hydrocracking catalyst is employed in the first hydrocracking reactor 17, while the activated catalyst of the present invention is employed in the second stage hydrocracking reactor 36. A suitable hydrocracking catalyst that may be employed in hydrocracking zone 17 is a "dual-functional" catalyst, i.e. a catalyst which combines a hydrogenation component with a good cracking component. The hydrogenation component may be, for example, any metal of Group 6b or of Group 8, or an oxide or sulfide of such metals, or a mixture of any of the foregoing. Examples of such catalysts are nickel, nickel sulfide, cobalt, cobalt sulfide, palladium, molybdenum oxide, molybdenum sulfide, tungsten oxide and tungsten sulfide. Suitable mixtures include nickel and tungsten, oxides of nickel and tungsten mixtures, and sulfided nickel and tungsten mixtures, among others. The carrier utilized is one having substantial cracking activity. While any of the known cracking catalysts, such as an acid treated natural clay may be used, the preferred carriers are the synthetic cracking catalysts of various types and more particularly those comprising silica with alumina. Examples of other suitable cracking carriers are composited materials containing silica and magnesia, titania and/or zirconia Zeolitic cracking catalysts, i.e., Y- and Y-type zeolites also can be used. Between about 0.1 and 50 percent by weight of the hydrogenation component (determined as the metal) may be deposited on the carrier, depending on the nature of the hydrogenation component and the activity thereof. When hydrogenation components having a high hydrogenation activity, e.g., platinum or palladium, are used the amounts will be in the lower part of the indicated range, preferably about 0.2 to 2 percent. When base metal hydrogenation components are used, the amounts will be in the upper part of the range indicated, preferably in the range of about 10 to 40 percent by weight.

The cracking component may be enhanced in activity by the addition of a halide promoter, such as fluorine, in amounts between about 0.5 and 10 percent and preferably between about 1.0 and 3.0 percent by weight of the catalyst 18. The catalyst may be prepared using any of the well-known methods for compositing catalysts with carriers.

The foregoing catalysts are relatively resistant to deactivation by the various impurities which are normally present in hydrocarbon feedstocks and are reasonably active for the hydrocracking of heavier components in such feedstocks. Thus, the combination of such deactivation-resistant catalysts in a first stage with an activated catalyst of the present invention in the second stage is a highly desirable combination. The chlorine-activated catalysts of the present invention are extremely active, but are relatively sensitive to impurities. The employment of such conventional catalysts in the first hydrocracking stage results in the removal of deactivating impurities which would adversely affect the highly active catalysts of the present invention.

Suitable hydrocracking conditions for the reaction zone 17 when the conventional "dual-functional" hydrocracking catalyst is employed include temperatures in the range of between about 650° and about 950° F., preferably between about 750° and about 850° F. Suitable pressures include those in the range of between about 500 and about 3000 p.s.i.g., preferably between about 750 and about 1500 p.s.i.g. The liquid hour space velocity, rate of hydrogen and hydrogen to hydrocarbon molar ratio employed are within the ranges previously described for the reactor 17.

Referring again more particularly to the drawing, the predominantly LPG effluent is passed by means of a line 38 to the line 19, where it joins the product stream issuing from the first hydrocracking reactor 17. In this way, the second hydrocracking zone effluent will be separated into the same desired fraction as is the first hydrocracking zone effluent while utilizing the same process equipment. This greatly simplifies the equipment requirements in the two-stage hydrocracking operation of the present invention.

Alternatively, the hydrocarbon charge stock to the two-stage system may be introduced into the distillation zone 26 by means of the line 39, instead of or in addition to that introduced into the line 11. By introducing the charge stock directly into the tower 26, a prefractionation occurs in which any hydrocarbons boiling below the $C_6+$ fraction are removed and thus will not enter the first hydrocracking reactor.

Although the $C_6$ fraction is more readily hydrocracked than the $C_5$ fraction, the $C_6$ fraction is somewhat more difficult to crack than the higher boil fraction of the naphtha feed. Accordingly, it may also be advantageous to include a part or all of the $C_6$ fraction (approximately 130° to 170° F. boiling range) in the feedstock to the second stage. In this case, the conditions in the second distillation tower are adjusted so as to take all or a part of the $C_6$ fraction overhead with the $C_5$ fraction, while the bottoms fraction, containing predominantly $C_7$ and higher fractions, is recycled to the first stage.

It will be seen from the foregoing description of the two-stage embodiment of the present invention that the separate hydrocracking of the pentane fraction results in additional LPG product under economically desirable mild hydrocracking conditions. Hydrocracking catalyst deactivation can be substantially avoided, since the impurities which would cause deactivation are either removed prior to the first stage or more preferably, a relatively impurity-insensitive hydrocracking catalyst is employed in the first stage in order to remove these impurities. The pentane fraction is contacted in the highly active second stage, where the activated catalyst of the present invention hydrocracks the substantially impurity-free pentane fraction to additional LPG under mild hydrocracking conditions. Since catalyst deactivation more readily occurs at higher temperatures, the employment of relatively low temperatures for hydrocracking substantially avoids catalyst deactivation in the second hydrocracking stage. The high activity of the second stage catalyst of the present invention permits a considerable reduction in the size of the second stage reactor and a considerable savings in energy requirements by virtue of the lower operating temperature.

This invention may be best understood by reference to the following specific examples, which are illustrative only and are not intended to be limiting as to scope. All of the percentages indicated are by weight, unless otherwise specified.

EXAMPLE 1

A commercial naphtha reforming catalyst in the amount of about 1200 milliliters containing 0.6 percent platinum on an alumina base, having a typical chlorine content of 0.6 percent chlorine and a typical surface area of about 425 square meters per gram is calcined at a temperature of 550° F. overnight and at 900° F. for two hours. This catalyst is reduced in a stream of hydrogen at 900° F. for two hours. The hydrogen flow rate utilized is 1.5 standard cubic feet per hour. The reduced catalyst is purged over a period of six hours in a flow of prepurified nitrogen.

The temperature of the catalyst is then raised to 1,050° F. in nitrogen and a hydrogen-hydrogen chloride mixture comprising 11 standard cubic feet of hydrogen per hour and 110 grams of hydrogen chloride per hour is passed over the catalyst for a period of three hours. The temperature is then reduced to 560° F. and a gaseous mixture comprising 100 grams of sulfur monochloride ($S_2Cl_2$) per hour, and four standard cubic feet of air per hour is passed over the catalyst for a period of three hours. At the end of the addition, the temperature is maintained at 560° F. for one additional hour with the air flow. At the conclusion of the activating gas addition, the temperature is raised to 800° F. over a one and one-hour hour period and held at a temperature of 800° F. for a one hour period while continuing only the air flow.

The temperature is then reduced to 400° F. and 100 grams per hour of hydrogen chloride are passed over the catalyst for a period of three hours. The catalyst is then cooled. An analysis of the catalyst indicates the presence of 4.6 percent chlorine.

EXAMPLE 2

To test the activity of the catalyst of Example 1, a continuous run is conducted employing a normal pentane feedstock. The pentane is passed over the catalyst at temperatures of 432° to 513° F. and a pressure of 1000 p.s.i.g. while employing a liquid hourly space velocity of two and a hydrogen to pentane molar ratio of 5:1.

The results of these runs indicate that the pentane conversions vary from 44.2 percent at 432° F. to 83.5 percent at 513° F. The selectivity to LPG (propane and butane) ranges from 65.1 percent to 77.1 percent in this temperature range as shown in Table I.

TABLE I

| | Thruput | | | | | | | | |
|---|---|---|---|---|---|---|---|---|---|
| | 16-20 | 28-32 | 32-36 | 36-40 | 48-52 | 52-56 | 56-60 | 64-68 | 84-88 |
| Average temp., °F | 487 | 500 | 503 | 513 | 483 | 478 | 479 | 483 | 451 |
| Product composition, percent by wt.: | | | | | | | | | |
| Hydrogen | 4.23 | 4.50 | 4.47 | 3.41 | 4.92 | 4.80 | 4.98 | 4.68 | 5.19 |
| Methane | 5.75 | 7.66 | 7.99 | 7.47 | 6.87 | 6.74 | 6.91 | 7.11 | 4.06 |
| Ethane | 10.84 | 11.03 | 11.12 | 11.89 | 10.61 | 10.21 | 10.12 | 10.53 | 5.87 |
| Ethylene | 0.18 | 0.24 | 0.27 | 0.24 | 0.38 | 0.38 | 0.09 | 0.22 | 0.07 |
| Propane | 28.73 | 26.73 | 27.22 | 29.48 | 26.20 | 24.50 | 24.79 | 25.10 | 13.49 |
| Propylene | 0.08 | | 0.12 | | 0.15 | | 0.13 | | 0.17 |
| Isobutane | 17.58 | 16.71 | 16.40 | 16.69 | 17.14 | 17.46 | 17.58 | 17.12 | 13.52 |
| n-Butane | 14.93 | 14.90 | 14.66 | 14.90 | 15.12 | 14.71 | 14.56 | 14.53 | 11.80 |
| Butenes | 0.04 | | 0.02 | 0.03 | 0.01 | 0.17 | | | |
| Isopentane | 15.62 | 15.76 | 15.42 | 13.57 | 16.00 | 18.31 | 17.68 | 18.03 | 28.31 |
| n-Pentane | 1.89 | 2.36 | 2.30 | 2.21 | 2.34 | 2.55 | 2.42 | 2.44 | 11.41 |
| Pentenes | 0.01 | 0.13 | | 0.11 | 0.13 | 0.17 | 0.13 | 0.13 | |
| Hexanes | | | | | | | 0.48 | | 0.10 |
| Others | 0.03 | | | | 0.10 | | 0.13 | 0.09 | 6.02 |
| Wt. balance | 103.5 | 99.2 | 101.0 | 113.9 | 96.1 | 99.7 | 91.0 | 97.7 | 99.4 |
| $C_5$ conversion, percent by wt | 81.6 | 80.9 | 81.5 | 83.5 | 80.6 | 77.9 | 78.7 | 78.4 | 58.1 |
| $C_3+C_4$ selectivity, percent by wt | 76.7 | 75.4 | 75.0 | 75.8 | 76.4 | 76.6 | 76.4 | 77.1 | 70.7 |

| | Thruput | | | | | | | |
|---|---|---|---|---|---|---|---|---|
| | 88-92 | 92-96 | 96-100 | 104-108 | 108-112 | 112-116 | 116-120 | 128-132 |
| Average temp., °F | 444 | 441 | 437 | 438 | 438 | 434 | 432 | 456 |
| Product composition, percent by wt.: | | | | | | | | |
| Hydrogen | 4.70 | 5.54 | 5.54 | 5.54 | 5.79 | 5.91 | 5.63 | 5.05 |
| Methane | 3.47 | 3.98 | 3.30 | 3.06 | 2.94 | 2.94 | 3.01 | 4.96 |
| Ethane | 4.56 | 5.60 | 4.72 | 4.37 | 4.23 | 4.51 | 4.44 | 6.96 |
| Ethylene | 0.18 | 0.30 | 0.23 | 0.17 | 0.10 | 0.09 | 0.18 | 0.15 |
| Propane | 10.50 | 11.36 | 10.10 | 8.98 | 8.53 | 8.56 | 8.33 | 16.19 |
| Propylene | 0.30 | 0.14 | 0.12 | 0.15 | 0.09 | 0.14 | 0.16 | 0.10 |
| Isobutane | 12.53 | 13.55 | 12.41 | 10.87 | 10.66 | 10.56 | 10.89 | 14.63 |
| n-Butane | 10.68 | 10.59 | 9.63 | 9.21 | 8.25 | 7.76 | 7.95 | 11.92 |
| Butenes | | | | 0.06 | | 0.02 | 0.02 | |
| Isopentane | 33.74 | 30.78 | 33.63 | 37.21 | 36.70 | 36.66 | 36.95 | 26.37 |
| n-Pentane | 13.15 | 11.92 | 13.46 | 14.19 | 15.67 | 15.95 | 15.69 | 8.96 |
| Pentenes | | | | | | | | |
| Hexanes | 0.07 | 0.08 | 0.07 | 0.09 | 0.01 | | | |
| Others | 6.30 | 6.15 | 6.80 | 6.09 | 7.04 | 6.92 | 6.74 | 4.73 |
| Wt. balance | 103.1 | 95.3 | 96.9 | 99.4 | 99.7 | 94.8 | 96.7 | 96.7 |
| $C_5$ conversion, percent by wt | 50.8 | 54.8 | 50.1 | 45.6 | 44.2 | 44.1 | 44.2 | 55.5 |
| $C_3+C_4$ selectivity, percent by wt | 69.9 | 68.8 | 68.3 | 68.0 | 65.8 | 65.1 | 65.8 | 71.8 |

EXAMPLES 3-4

For comparative purposes, the 513° F. normal pentane run of Example 2 is compared with a nickel-tungsten-fluoride on silica-alumina catalysts and a palladium fluoride on silica-alumina catalyst. These latter two catalysts are employed for hydrocracking a $C_5$ naptha fraction and normal pentane, respectively, at a temperature of about 900° to 950° F., a pressure of 1000 p.s.i.g., and a hydrogen to hydrocarbon mole ratio of 8:1. The results of these runs are shown in Table II below.

EXAMPLE 5

One hundred-seventy milliliters of the reduced and calcined catalyst of Example 1 are heated to a temperature of 1050° F. in nitrogen and a hydrogen-hydrogen chloride mixture comprising 1.5 standard cubic feet of hydrogen per hour, and 14 grams of hydrogen chloride per hour are passed over the catalyst for a period of three hours. The temperature is then reduced to 600° F. with nitrogen and then a gaseous mixture comprising 15 grams of sulfur dioxide per hour, 18 grams of chlorine per hour

TABLE II

| | Example No. | | |
|---|---|---|---|
| | 2 | 3 | 4 |
| Catalyst | Sulfur monochloride, activated Pt-alumina | 6% Ni, 19% W, 2% F on silica-alumina | 1% Pd, 2% F on silica-alumina |
| Feed | | $C_5$ naphtha | |
| | Pentane | fraction | Pentane |
| Product distribution, percent by wt.: | | | |
| $C_1+C_2$ | 20.4 | 15.7 | 10.5 |
| $C_3$ | 30.5 | 30.0 | 17.5 |
| $C_4$ | 32.8 | 22.0 | 11.9 |
| $C_5$ | 16.5 | 32.0 | 60.5 |
| Conversion, percent by wt | 83.5 | 68 | 39 |
| Selectivity to LPG, percent by wt | 75.8 | 77 | 76 |
| Per pass yield of LPG, percent by wt | 63.3 | 52 | 30 |

As seen by the comparative results in Table II, temperatures of at least 900° F. are required with a conventional hydrocracking catalyst compared with 513° F. for an activated catalyst of this invention to approach the conversion and selectivities which are achieved with the catalyst of the present invention.

and 16 grams of oxygen per hour are passed over the catalyst for a period of nine hours.

At the conclusion of the activating gas addition, the temperature is raised to 850° F. over a one hour period and is held at 850° F. for one hour with a flow of 15 grams of oxygen per hour and 0.2 standard cubic feet of nitrogen per hour.

The temperature is then reduced to 400° F. in nitrogen and 16 grams of hydrogen chloride per hour are passed over the catalyst for a three hour period. Next, the catalyst is cooled and analyzed. The analysis indicates that the catalyst contains 4.1 percent chlorine.

EXAMPLE 6

The catalyst of Example 5 is tested for its activity in hydrocracking hexane so as to produce LPG. Thus, hexane is passed over the catalyst under a pressure of 1000 p.s.i.g., a liquid hourly space velocity of two and a hydrogen to hexane mole ratio of 5:1. The temperature is varied over a range of from about 443° to about 491° F.

The results of these runs illustrate that high conversion and selectivities are achievable employing the process of the present invention. Thus, the conversion and selectivity to LPG varies from 62.1 and 62.0, respectively, at 443° F. to 96.0 and 67.2 respectively, at 491° F. The yield of LPG is from 38.5 to 64.5 percent.

EXAMPLE 7

A $C_5$ to $C_8$ cut of a Kuwait naphtha is preliminarily refined employing a sulfided nickel-tungsten or alumina catalyst that is produced by passing hydrogen and hydrogen sulfide gas over the catalyst for a period of one hour at 600° F. Eighteen standard cubic feet per hour of hydrogen and two standard cubic feet per hour of hydrogen sulfide are employed for this purpose. The fraction is refined at a temperature of 650° F., under a pressure of 1800 p.s.i.g., a liquid hourly space velocity of 2.0 while employing 5000 standard cubic feet per hour of hydrogen per barrel. An analysis of this friction after the refining treatment revealed the composition set forth in Table III:

TABLE III

| | |
|---|---|
| Sulfur, wt. percent | <0.01 |
| Nitrogen, p.p.m. | <0.2 |
| Components, wt. percent: | |
|    Isobutane | 0.06 |
|    n-Butane | 0.46 |
|    Isopentane | 3.52 |
|    n-Pentane | 7.60 |
|    $C_6$ and heavier | 88.37 |
| Component type, wt. percent: | |
|    Paraffins | 70.6 |
|    Cycloparaffins | 29.1 |
|    Benzene | 0.2 |

Next, the $C_5$ to $C_8$ fraction is hydrocracked employing the sulfur dioxide-chlorine activated catalyst of Example 5 at a pressure of 1000 p.s.i.g., a liquid hourly space velocity of two and a 5:1 hydrogen to hydrogen molar ratio. The results are set forth in Table IV below:

TABLE IV

| | Conversion | Selectivity | Yield |
|---|---|---|---|
| Temperature, ° F.: | | | |
| 353 | 21.6 | 100.0 | 21.6 |
| 389 | 26.0 | 99.2 | 25.8 |
| 408 | 37.1 | 99.5 | 36.9 |
| 440 | 49.3 | 97.0 | 47.8 |
| 466 | 55.7 | 96.8 | 53.9 |
| 486 | 69.3 | 91.9 | 63.7 |
| 503 | 73.6 | 88.9 | 65.4 |
| 529 | 83.2 | 84.1 | 70.0 |
| 540 | 90.6 | 83.6 | 75.7 |
| 544 | 90.7 | 86.5 | 78.5 |

The results set forth in Table IV illustrate that high conversions, selectivities and yields of $C_3$ and $C_4$ hydrocarbons (LPG) are attainable from a $C_5$ to $C_8$ naphtha fraction under relatively mild temperature conditions by employing the activated catalyst of the present invention.

The following examples illustrate the employment of various activated catalysts of the present invention in the hydrocracking of a pentane fraction.

EXAMPLES 8–33

The reduced and calcined catalyst of Example 1 is activated employing the activating agents listed in Table V below, with and/or without a treatment with hydrogen chloride, as indicated, and is utilized for the hydrocracking of pentane under the hydrocracking conditions of Example 10, except for the temperatures which are specified:

TABLE V

| Example No.: | Activating Agent | HCl pretreat | HCl post-treat | Hydrocracking temperature, °F. |
|---|---|---|---|---|
| 8 | $SOCl_2$ | | | 500 |
| 9 | $SOCl_2$ | Yes | | 480 |
| 10 | $CCl_4$ | Yes | | 475 |
| 11 | $CCl_4$ | Yes | Yes | 460 |
| 12 | $SCl_2$ | Yes | | 485 |
| 13 | $SO_2+Cl_2$ | | | 500 |
| 14 | $CH_2Cl_2$ | Yes | Yes | 500 |
| 15 | $CCl_2F_2$ | Yes | | 520 |
| 16 | $CCl_3Br$ | Yes | | 510 |
| 17 | $CCl_2BrF$ | Yes | | 510 |
| 18 | $SCl_4$ | | | 510 |
| 19 | $SCl_3I$ | | | 525 |
| 20 | $POCl_3$ | Yes | | 530 |
| 21 | $PCl_3$ | Yes | | 520 |
| 22 | $BCl_3$ | Yes | | 535 |
| 23 | $CHCl_2CHCl_2$ | Yes | | 530 |
| 24 | $CCl_3CCl_3$ | Yes | | 535 |
| 25 | $CCl_2=CCl_2$ | Yes | | 535 |
| 26 | $CH_3CCl_3$ | Yes | | 520 |
| 27 | $CHCl_2COCl$ | Yes | | 535 |
| 28 | $SOBr_2$ | Yes | | 510 |
| 29 | $PBr_5$ | Yes | | 545 |
| 30 | $BBr_3$ | Yes | | 550 |
| 31 | $CHBr_3$ | Yes | | 535 |
| 32 | $CHBr_2CH_2Br$ | Yes | | 540 |
| 33 | $CH_3CH_2ClCCl_3$ | Yes | | 545 |

The activation conditions and those employed for the hydrogen chloride treatments when employed, are similar to those utilized in Example 1. It is to be noted that the maximum activity of the bromine activated catalyst is about 25° F. higher than the corresponding chlorine activated catalyst.

In each instance, the employment of the activated catalysts of Examples 8–33 for the hydrocracking of the pentane results in high conversions, selectivities and yields of $C_3$ and $C_4$ hydrocarbons. The additional treatment with hydrogen chloride resulted in an increased yield of LPG over that achieved with the respective catalyst that had $C_4$ hydrocarbons.

The term "hydrocracking conditions" as employed herein is defined as those conditions, e.g. temperature, pressure, space velocity, etc., which are sufficiently severe to convert a substantial portion of the feedstock to LPG, i.e. $C_3$ and $C_4$ hydrocarbons.

Obviously many modifications and variations of the invention as hereinabove set forth can be made without departing from the spirit and scope thereof and, therefore, only such limitations should be imposed as are indicated in the appended claims.

We claim:

1. A process for the production of LPG which comprises contacting a hydrocarbon charge stock boiling in the range below 500° F. and hydrogen under hydrocracking conditions at a temperature of about 700° F. or less with an activated composite catalyst comprising a major proportion of alumina and containing a minor proportion of a metalliferous material having hydrogenating activity, said composite material having been activated by treatment with an activating agent selected from the group consisting of (A) a sulfur chloride having the generic formula

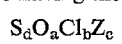

$$S_dO_aCl_bZ_c$$

wherein Z is a halogen other than chlorine, $d$ is 1 or 2, $a$ is 0, 1, 2, 3 or 5, $b$ is 2, 4 or 7, $c$ is 0 or 1 and the sum of $b$ and $c$ is 2 to 8, (B) a mixture comprising sulfur dioxide and chlorine.
(C) a phosphorus chloride,
(D) boron trichloride,
(E) a carbon chloride having the formula

wherein X and Y may be the same or different groups and when taken individually are hydrogen, halogen or SCl, and when taken together are oxygen or sulfur,
(F) a poly-carbon polychloride having at least two chlorine atoms,
(G) an acetyl chloride,
(H) a bromine-containing activating agent corresponding to any of the chlorine-containing activating agents of (A) through (G), and
(I) a mixture of at least two of the activating agents specified in (A) through (H), and the activation having been conducted under non-reducing conditions at a temperature effective to promote a substantial increase in the chlorine or bromine content of the catalyst, with the proviso that when a carbon chloride or carbon bromide activating agent is employed, the said composite material is subjected to a pretreatment with hydrogen chloride.

2. The method of claim 1 wherein the hydrocarbon charge stock is hydrocracked at a temperature in the range of between about 350° and about 700° F.

3. The method of claim 2 wherein the charge stock is hydrocracked at a temperature in the range of between about 400° and about 525° F.

4. The method of claim 3 wherein the charge stock is hydrocracked at a temperature in the range of between about 460° and about 525° F.

5. The process of claim 1 wherein the hydrocarbon charge stock comprises pentane.

6. The process of claim 1 wherein the hydrocarbon charge stock comprises a naphtha fraction.

7. The process of claim 1 wherein the activating agent is sulfur monochloride.

8. The process of claim 1 wherein the activating agent is a mixture of sulfur dioxide and chlorine.

9. The process of claim 1 wherein the metalliferous material is selected from palladium and platinum.

10. The process of claim 1 wherein the composite material is subjected to a pretreatment and an aftertreatment with hydrogen chloride.

11. A process for the production of LPG which process comprises contacting a liquid hydrocarbon charge stock boiling in the range below 500° F. and hydrogen with a hydrocracking catalyst in a first hydrocracking zone under conditions such as to produce a fraction comprising predominantly propane and butane, a $C_5$ fraction and a $C_6+$ fraction, recovering the propane and butane fraction as LPG product and contacting the said $C_5$ fraction in the presence of hydrogen under hydrocracking conditions at a temperature of about 700° F. or less with an activated composite catalyst comprising a major proportion of alumina and containing a minor proportion of metalliferous material having hydrogenating activity, said composite material having been activated by treatment with an activating agent selected from the group consisting of
(A) a sulfur chloride having the generic formula $$S_dO_aCl_bZ_c$$

wherein Z is a halogen other than chlorine, $d$ is 1 or 2, $a$ is 0, 1, 2, 3 or 5, $b$ is 2, 4 or 7, $c$ is 0 or 1 and the sum of $b$ and $c$ is 2 to 8, (B) a mixture comprising sulfur dioxide and chlorine,
(C) a phosphorous chloride,
(D) boron trichloride,
(E) a carbon chloride having the formula

wherein X and Y may be the same or different groups and when taken individually are hydrogen, halogen or SCl, and when taken together are oxygen or sulfur,
(F) a poly-carbon polychloride having at least two chlorine atoms,
(G) an acetyl chloride,
(H) a bromine-containing activating agent corresponding to any of the chlorine-containing activating agents of (A) through (G), and
(I) a mixture of at least two of the activating agents specified in (A) through (H), the activation having been conducted under non-reducing conditions at a temperature effective to promote a substantial increase in the chlorine or bromine content of the catalyst, with the proviso that when a carbon chloride or carbon bromide activating agent is employed, the said composite material is subjected to a pretreatment with hydrogen chloride.

12. The process of claim 11 wherein the catalyst in the first treating zone comprises a silica-alumina supported Group 8 metal.

13. The process of claim 11 wherein the $C_5$ fraction is hydrocracked at a temperature in the range of between about 350° and about 700° F.

14. The process of claim 13 wherein the $C_5$ fraction is hydrocracked at a temperature in the range of between about 400° and about 525° F.

15. The process of claim 13 wherein the $C_5$ fraction is hydrocracked at a temperature in the range of between about 460° and about 525° F.

16. The process of claim 11 wherein the activating agent is sulfur monochloride.

17. The process of claim 11 wherein the activating agent is a mixture of sulfur dioxide and chlorine.

18. The process of claim 11 wherein the composite material is subjected to a pretreatment and an aftertreatment with hydrogen chloride.

19. The process of claim 11 wherein the metalliferous material is selected from palladium and platinum.

20. The process of claim 11 wherein the temperature in the first hydrocracking zone is between about 650° and about 950° F.

21. The process of claim 20 wherein the temperature in the first hydrocracking zone is between about 750° and about 850° F.

References Cited

UNITED STATES PATENTS

| 2,479,109 | 8/1949 | Haensel | 208—139 |
| 3,213,012 | 10/1965 | Kline et al. | 208—111 |
| 3,265,610 | 8/1966 | Laveigne et al. | 208—59 |

DELBERT E. GANTZ, Primary Examiner

ABRAHAM RIMENS, Assistant Examiner

U.S. Cl. X.R.

208—112

PO-1050
(5/69)

UNITED STATES PATENT OFFICE
CERTIFICATE OF CORRECTION

Patent No. 3,505,205      Dated April 7, 1970

Inventor(s) Joseph P. Giannetti, Howard G. McIlvried and Raynor T. Sebulsky

It is certified that error appears in the above-identified patent and that said Letters Patent are hereby corrected as shown below:

Column 7, line 26 "$(CCl_3Sl)$" should be --$(CCl_3SCl)$--.

Column 9, line 68 "Resistor" should be --reactor--.

Column 12, line 55 "one-hour hour" should be --one-half hour--.

Column 15, line 33 "friction" should be --fraction--.

Column 15, line 53 "hydrogen to hydrogen" should be --hydrogen to hydrocarbon--.

Column 16, in Table V, around line 30, Example Number column "29, 39, 31" should be --29, 30, 31--.

Column 16, in Table V, Example Number 23 "$CHC_2CHCl_2$" should be --$CHCl_2CHCl_2$--.

Column 16, line 48 "$C_4$ hydrocarbons" should be --not been so-treated--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents